US008213857B2

(12) United States Patent
Nichols et al.

(10) Patent No.: US 8,213,857 B2
(45) Date of Patent: *Jul. 3, 2012

(54) PROVIDING CONTENT TO A DEVICE

(75) Inventors: Timothy C. Nichols, Los Altos, CA (US); Mark Andrew Ross, San Carlos, CA (US); Clare Lawson, Los Altos, CA (US); Arthur Anthonie van Hoff, Menlo Park, CA (US)

(73) Assignee: Dell Products L.P., Round Rock, TX (US)

( * ) Notice: Subject to any disclaimer, the term of this patent is extended or adjusted under 35 U.S.C. 154(b) by 375 days.

This patent is subject to a terminal disclaimer.

(21) Appl. No.: 12/615,543

(22) Filed: Nov. 10, 2009

(65) Prior Publication Data

US 2010/0056042 A1 Mar. 4, 2010

Related U.S. Application Data

(62) Division of application No. 11/355,816, filed on Feb. 16, 2006, now Pat. No. 7,653,342.

(51) Int. Cl.
*H04H 20/71* (2008.01)
*H04H 40/00* (2008.01)
*H04H 60/09* (2008.01)
*H04B 7/00* (2006.01)
*H04B 1/18* (2006.01)

(52) U.S. Cl. ..................... 455/3.01; 455/3.06; 455/66.1; 455/180.1

(58) Field of Classification Search ................. 455/3.01, 455/3.06, 3.05, 344, 66.1, 180.1
See application file for complete search history.

(56) References Cited

U.S. PATENT DOCUMENTS 5,616,876 A * 4/1997 Cluts ............................... 84/609
6,185,527 B1 * 2/2001 Petkovic et al. .............. 704/231
6,202,058 B1 3/2001 Rose
6,345,256 B1 * 2/2002 Milsted et al. .................. 705/64
6,434,520 B1 * 8/2002 Kanevsky et al. ............ 704/243
6,529,584 B1 * 3/2003 Ravago et al. ............... 379/67.1
6,545,209 B1 * 4/2003 Flannery et al. ................ 84/609
6,636,774 B2 * 10/2003 Tenma et al. ................... 700/96
6,779,196 B1 * 8/2004 Igbinadolor .................... 725/75
6,965,770 B2 * 11/2005 Walsh et al. ............... 455/426.1
7,171,174 B2 * 1/2007 Ellis et al. ..................... 455/132
7,190,971 B1 3/2007 Kawamoto
7,221,902 B2 5/2007 Kopra et al.
(Continued)

OTHER PUBLICATIONS

U.S. Appl. No. 11/355,817, Feb. 21, 2008, Office Action.

(Continued)

*Primary Examiner* — Tilahun B Gesesse
(74) *Attorney, Agent, or Firm* — Workman Nydegger

(57) ABSTRACT

Providing content to a device. Content stored on a device can be examined or searched based on the programming of channels that are available to the device over various networks. The content can be searched using other rules related to user preferences or content characteristics. Based on the results of the examination of the content, playlists are generated. Each playlist includes content from the device that matches or partially matches the content associated with one of the channels. Using the playlists, a user can load content from their device that has a theme consistent with a particular channel. When signal loss is detected for a given channel, the playlist associated with that channel can be loaded and played by the device. The device can resume playing the channel when the signal is again adequately detected.

12 Claims, 3 Drawing Sheets

U.S. PATENT DOCUMENTS

| | | | | |
|---|---|---|---|---|
| 7,251,452 | B2 * | 7/2007 | Stumphauzer, II | 455/3.06 |
| 7,251,475 | B2 | 7/2007 | Kawamoto | |
| 7,266,343 | B1 | 9/2007 | Yli-juuti et al. | |
| 7,362,999 | B2 | 4/2008 | Petschke et al. | |
| 7,366,461 | B1 * | 4/2008 | Brown | 455/3.06 |
| 7,409,205 | B2 | 8/2008 | Mittal | |
| 7,454,166 | B2 | 11/2008 | Patsiokas et al. | |
| 7,496,327 | B2 | 2/2009 | Nagamoto et al. | |
| 7,539,478 | B2 * | 5/2009 | Herley et al. | 455/345 |
| 7,555,539 | B1 | 6/2009 | Rosenberg | |
| 7,590,993 | B1 | 9/2009 | Hendricks | |
| 7,853,600 | B2 | 12/2010 | Herz | |
| 2002/0069218 | A1 | 6/2002 | Sull | |
| 2002/0120925 | A1 * | 8/2002 | Logan | 725/9 |
| 2003/0014767 | A1 * | 1/2003 | Stumphauzer, II | 725/131 |
| 2003/0093790 | A1 | 5/2003 | Logan | |
| 2003/0129941 | A1 | 7/2003 | Kawamata | |
| 2003/0135857 | A1 | 7/2003 | Pendakur | |
| 2004/0199387 | A1 * | 10/2004 | Wang et al. | 704/243 |
| 2004/0268413 | A1 | 12/2004 | Reid | |
| 2005/0108754 | A1 | 5/2005 | Carhart | |
| 2005/0210501 | A1 | 9/2005 | Zigmond | |
| 2006/0140107 | A1 | 6/2006 | Kanegae | |
| 2006/0253782 | A1 | 11/2006 | Stark | |
| 2006/0276174 | A1 | 12/2006 | Katz | |
| 2007/0053513 | A1 | 3/2007 | Hoffberg | |
| 2007/0077882 | A1 | 4/2007 | Patsiokas et al. | |
| 2007/0089151 | A1 | 4/2007 | Moore | |
| 2007/0129007 | A1 | 6/2007 | Kawamoto | |
| 2007/0143816 | A1 | 6/2007 | Gupta | |
| 2007/0174147 | A1 | 7/2007 | Klein | |
| 2008/0032622 | A1 | 2/2008 | Kopra et al. | |
| 2008/0160910 | A1 * | 7/2008 | Khedouri et al. | 455/3.06 |
| 2008/0305738 | A1 * | 12/2008 | Khedouri et al. | 455/3.06 |

OTHER PUBLICATIONS

U.S. Appl. No. 11/355,817, Oct. 15, 2008, Office Action.
U.S. Appl. No. 11/355,817, Feb. 4, 2009, Office Action.
U.S. Appl. No. 11/355,817, Sep. 30, 2009, Office Action.
U.S. Appl. No. 11/355,817, Apr. 9, 2010, Office Action.
U.S. Appl. No. 11/355,817, Sep. 30, 2010, Office Action.
U.S. Appl. No. 11/355,817, Mar. 3, 2011, Office Action.
U.S. Appl. No. 11/355,817, May 17, 2011, Office Action.
U.S. Appl. No. 11/355,817, Oct. 4, 2011, Office Action.
U.S. Appl. No. 11/355,817, Jan. 31, 2012, Office Action.

* cited by examiner

PROVIDING CONTENT TO A DEVICE

CROSS-REFERENCE TO RELATED APPLICATIONS

The present application is a divisional of U.S. patent application Ser. No. 11/355,816 filed Feb. 16, 2006, which is incorporated herein by reference in its entirety.

BACKGROUND OF THE INVENTION

1. The Field of the Invention

The present invention relates to discovering content with a device. More particularly, embodiments of the invention relate to systems and methods for providing content to a device and specifically when the content transmitted to the device is unavailable.

2. The Relevant Technology

In today's world, digital media has become a common source of news and entertainment and the digital media can be delivered in a variety of different ways and locations. Radio stations, for example, broadcast over the open air to certain markets as well as over satellite networks and computer networks. Television programming can be received over cable and satellite networks. Performances, sporting events and talk shows can be attended, watched live, or recorded for later viewing. The ability to experience the content of these different types of programming has become an everyday occurrence for many people.

Not surprisingly, different people often prefer to experience different types of content. Some persons, for example, may enjoy listening exclusively to talk radio, while other persons may desire to listen to classical music or watch the latest movies. This aspect of people's personalities has led content providers, at least in part, to develop specialized or themed channels where the content on a particular channel fits within a defined space or genre. Some radio stations, for example, are dedicated to talk shows while other stations play only a particular type of music. In each case, the content provided by a given content provider is often directed to a specific target audience or demographic.

In satellite radio, multiple channels can be delivered to subscribers over the satellite network and the ability to provide themed channels is also evident in satellite radio. Many of the channels on satellite radio have a particular theme or provide only a particular type of content. There are channels, for example, that are dedicated to certain music genres as well as stations that focus on sports programming or talk radio.

The content on each of these channels is programmed by a content provider. One attractive feature of programmed content on a given channel is that the user can expect to receive a certain type of content or receive content that presumably fits within the content requirements of the channel. Because the content provider typically has more source content than the typical subscriber, another attractive feature of programmed content is that the users receiving the programmed content may experience content that they might not have experienced otherwise. In addition, the subscriber may experience content in an unexpected order.

While users often enjoy listening to satellite radio, they also enjoy listening to content that may be stored on their device. The difficulty faced by these users, however, is in creating playlists that have different themes. Conventional devices, for example, typically provide only two modes of playback: (i) in order and (ii) random. The only option for generating a playlist that is not in order or random is to manually create the playlist. As many users know, the process of manually creating a playlist is cumbersome and may require the user to sort through a large library of content. In other words, successfully creating playlists that are themed or that are different from playing the stored content in order or randomly is to manually create the playlist.

Another difficulty faced in satellite radio relates to situations where the satellite signal is weak or unavailable. In some instances, the device may have a buffer present to account for signal loss. Nonetheless, there are times when the buffer is insufficient to adequately protect against signal loss or against a weak signal. As a result, the user is likely to experience an interruption when content is unavailable. The user may be able to switch to the content that is stored on the device. Unfortunately, manually selecting content or another playlist can still interrupt the user's listening experience. For instance, the manually selected content is unlikely to have the same feel or theme as the channel that was being experienced. In addition, the user may be required to actively select a playlist manually.

BRIEF SUMMARY OF THE INVENTION

These and other limitations are overcome by embodiments of the present invention, which relates to systems and methods for providing content to a user of a device and more particularly to transitioning to stored content when a signal delivering content to a device is inadequate or otherwise unavailable. When a loss condition is detected (e.g., lost signal, inadequate signal to noise ratio), the device selects a playlist on the device and begins to play the selected playlist. The playlist is often created based on the channels available to the device. Thus, the content associated with the various playlists is consistent with the channels available to the device. A particular playlist, for example, has a theme or feel that is consistent with a particular channel. As a result, the selected channel is typically associated with the lost channel and the content provided by the device is consistent with the channel that was being experienced on the device.

In one example, a device receives content over at least one network which may include a satellite network, a wireless network, and/or an IP based network. The method for providing content to the device typically begins when the device detects a loss condition such as loss of a signal. The signal is used to deliver at least a particular channel to the device. The loss of signal may include a signal to noise ratio that is below a threshold or may be based on another characteristic of the signal that is inadequate. After detecting the loss of the signal, a playlist is accessed from the device. The playlist typically identifies or references content that is consistent with or that matches content that was being delivered on the channel that was lost. The content of the selected playlist is then loaded and played. When the signal is again detected, the device may resume playing the channel. The transitions from the channel to the playlist and from the playlist to the channel can be configured to minimize the interruption to the user.

In another example, a system delivers content including one or more channels to a device over a satellite network. The method for providing content to the device when a signal from the satellite network (or other network) is insufficient to play content from a particular channel may begin by generating playlists. Each playlist is typically associated with a channel transmitted over the satellite network as well as with specific content stored on the device. The playlists are generated such that the content associated with each playlist is consistent with the associated channel. When a loss of a signal is detected, the device plays the playlist associated with one of the channels delivered over the satellite network. Preferably, the selected playlist is associated with the specific channel that was playing on the device when the loss of signal was detected. When the signal is determined to be adequate, the device can resume playing the channel.

Additional features of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to systems and methods for discovering content and more particularly to programming content on a device. Many users, for example, typically have a device that stores some of the user's content or includes other lists that identify content associated with the user. A user's device may also work in conjunction with another device such as a computer or online service or repository that stores additional content. Embodiments of the invention program the content on the device based on the content that may be provided from another source. In particular, the content on a device can be programmed in response to a style that corresponds to the content provided by a content provider.

For example, a satellite radio content provider typically provides themed channels and embodiments of the invention enable the device to suggest content from the device that is consistent with a particular theme or themes. Embodiments of the invention also enable a user to discover channels provided by a content provider that are consistent with the content stored on the user's device. In another example, a device provides stored content to a user when an external content source is blocked or temporarily unavailable. In this manner, the user experiences fewer interruptions.

Figure 1:
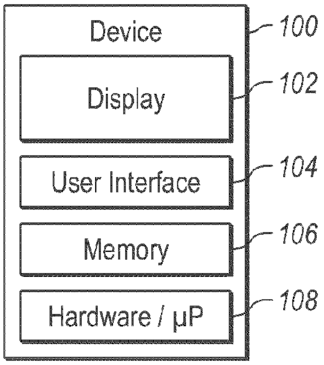
FIG. 1 illustrates an exemplary device for implementing embodiments of the invention.

FIG. 1 illustrates an exemplary device in accordance with the present invention. The device 100 is representative of both portable and non-portable devices that can receive, store, and/or play digital content. Examples of the device 100 include, but are not limited to, portable audio players (MP3 players), portable DVD or CD players, personal digital assistants, cellular telephones, computers, satellite radios, or any combination thereof.

The device 100 in FIG. 1 includes a display 102 and a user interface 104. The user interface 104 enables a user to interact with the device 100 and the display 102 provides visual information to a user of the device. The device 100 also includes memory 106 and hardware 108. The memory 106 can be volatile and/or non-volatile. The memory 100 may store data related to the operation of the device including an operating system and user preferences as well as store content. The content may include, digital music, talk, and the like or any combination thereof. The hardware 108 includes the processor and/or other electronic components that facilitate the content stored in the memory 106 to be played, that enable the device 100 to receive content or that enable the device 100 to interact with other devices and networks. In some instances, the device 100 may have the capability to interact with other similar devices or to dock with a personal computer.

Figure 2:
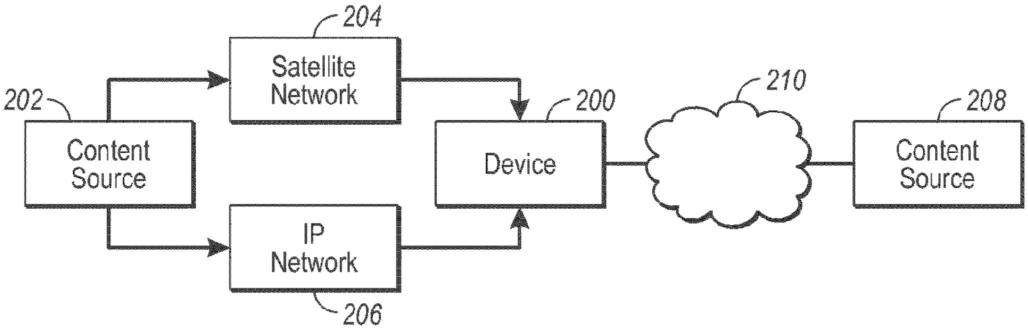
FIG. 2 shows an exemplary environment including networks used to deliver content to a device.

In one embodiment, the device 100 is a satellite radio, but one of skill in the art can appreciate that embodiments of the invention relate to other types of devices as well including those described above. As illustrated in FIG. 2, the device 200, which is one embodiment of the device 100, can receive content from a content source 202 over one or more networks. The device 200 receives content over the satellite network 204 and/or over an IP network 206. The content transmitted to the device 200 over the satellite network 204 may be similar or identical to the content transmitted over the IP network 206.

The IP network 206 is representative of other networks that may be accessible to the device 200. By way of example, Bluetooth networks, WiFi networks, cellular networks, and other wireless networks may be accessible to the device 200 and are represented by the IP network 206. The device 200 may also have access to the Internet or a LAN when docked with a computer or using a wireless connection. For example, the device 200 may have the capability to access other content providers or servers 208 over the network 210. The network 210 may be the Internet, for example, and may be the same as the IP network 206.

Figure 3:
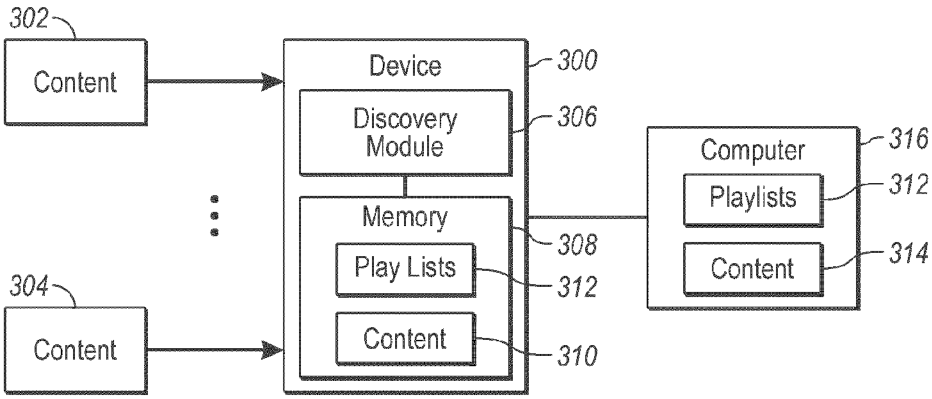
FIG. 3 illustrates a device's discovery module that is used to examine the content on the device and generate playlists based on programming received by the device.

FIG. 3 illustrates an example of a device that discovers content. The device 300, which is an embodiment of the device 100, receives at least one of the content 302 and the content 304. The content 302 and the content 304, in this example, are delivered over different networks as illustrated in FIG. 2, but may be the same or different content. The device 300 also has access to content 310 and playlists 312, both of which are stored in the memory 308 of the device 300. Additional content 316 and playlists 314 may be stored on the computer 318 and accessible to the device when docked or over a network connection. In some instances, the content 310 is a subset of the content 316.

The device 300 of FIG. 3 also includes a discovery module 306 that can interact with the content 302, 304, the content 310 stored on the device and the content 316 stored on the computer 318. The discovery module 306 examines the content 310 and/or the content 316. The discovery module 306, after examining the content 310, can enable the user to experience channels that carry similar content.

Generally stated, the discovery module 306 can generate playlists 312 of the content 310 and/or 316 that are similar to or that are consistent with the channels received by the device from content providers. In another example, the discovery module 306 can examine the content and then recommend specific channels from the channels available to the device that are consistent to the content stored and/or accessible to the device 300.

Thus, the discovery module 306 generates playlists 312 from the content 310 that correspond to channels available in the content 302, 304. For example, if the content 302 includes a channel dedicated to jazz music, then the discovery module 306 may generate a playlist 312 from the content 310 (and/or the other content available to the device 300) that may be similar to or consistent with the channel dedicated to jazz music. In another embodiment, when the device loses the satellite signal, the device can begin playing the appropriate playlist that is consistent to the channel that was lost. When possible, the change to stored content can be seamless from the perspective of the user, which enhances the user experience because the user does not experience any interruption. When the satellite signal is again available, the device can resume playing the content received over the satellite network. In some instances, the stored content may include content that was previously recorded from the channel that has been lost. In other words, a device as described herein may also record content from the various channels available to the device. The recorded content can be used in this example.

Figure 4:
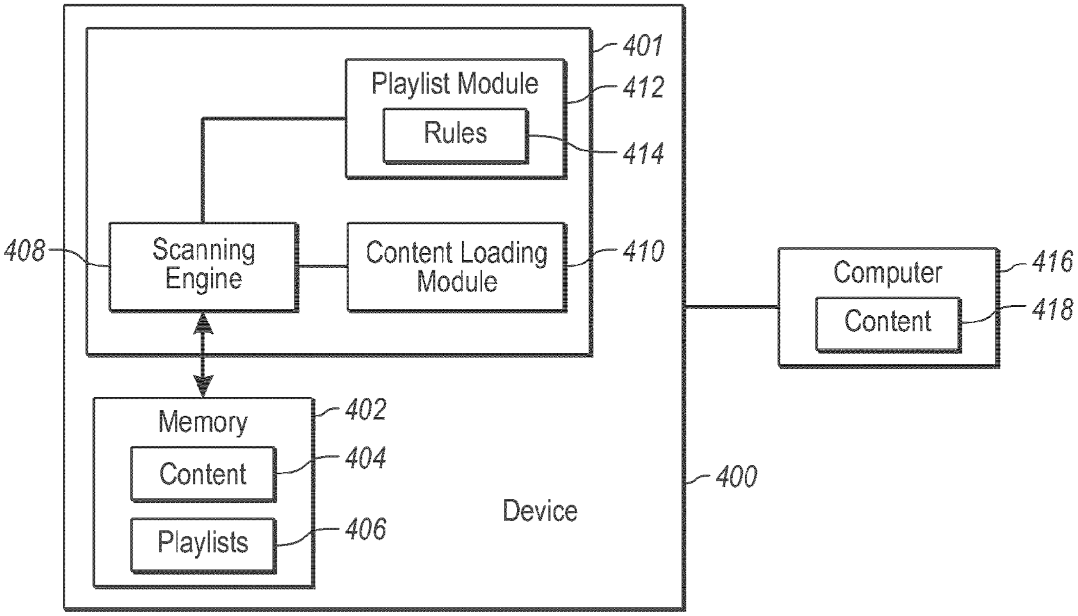
FIG. 4 illustrates another embodiment of the discovery module used to examine the device's content and generate playlists.

FIG. 4 illustrates a device 400, which is another embodiment of the device 100, which illustrates one embodiment of the discovery module shown in FIG. 3. The discovery module 401 includes a scanning engine 408, a playlist module 412, and a content loading module 410. The playlist module 412 may be based on programming associated with a content provider. The playlist module 412 can also be updated or modified at any time. For example, a satellite radio content provider may provide multiple channels of content. The playlist module 412 may be based on the programming style of the channels generated and transmitted by the content provider. This enables the playlist module 412 to identify the content that is similar to or consistent with the various channels provided by the content provider.

The programming style of the channels can be embodied as the rules 414. The rules 414 of the playlist module 414, for example, may identify artists that are associated with specific channels. Because a particular artist may be played on more than one channel, each artist may also have a score that indicates which channel is more likely for the specific artist. The rules 414 can also include information about genre, time periods describing when the content was created, metadata describing the content, and the like or any combination thereof. The rules 414 can therefore include the information and other metadata that defines the type of content that corresponds with each particular channel.

The rules 414 may also take into account other information that may be specific to the device, although some of the same information may be received from an external source and be representative of a larger sample of users. Content ratings, for example, can be set by a user for the content on the device. However, the same content may also have ratings that are generated by another entity. In either case, these ratings can be considered by the rules 414 in generating the playlists 406. The rules 414 may also consider the content (such as songs) that have actually been played by the user as well as the number of times specific content has been played. The rules 414 can also be updated dynamically or otherwise changed by a service and/or by the user.

The playlist module 412 uses the scanning engine 408 to examine the content 404 stored in the memory 402. The playlist module 412 may also examine the content stored on another device such as a desktop computer 416 associated with the device 400. The content loading module 410 can then load content based on the playlists 406. In one embodiment, the playlist module 412 operates on the computer 416 on the content 418. The playlists that are generated can then be transferred to the device 400.

Figure 5:
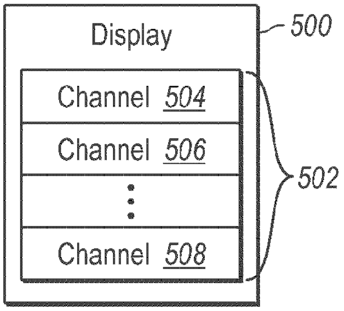
FIG. 5 illustrates one embodiment of the results that may be generated by an examination or search of the device's content.

The results of the examination of the content can be represented in various forms. FIG. 5 illustrates one example of the data returned by the scanning engine 408 or by the playlist module 412. The display 500 includes a set of channels 502. The channels 502 represent the channels, in this example, that best match or that are most consistent with the content stored on the device. The channel 504, for example, has the highest affinity with the content on the device and the channels 506 and 508 have less affinity. It may be the case that the set of channels 502 may be generated in response to content stored on the user's computer rather than content actually stored on the device. In this sense, the set of channels 502 still represents the user's content and in one embodiment, is representative of a broader scope of the user's content.

When the user selects, for example, the channel 504, the device can tune to that particular channel and begin playing. In one example, the channels with the highest affinity to the user's stored content can be set as the user's channel presets. Alternatively, when the user selects the channel 504, a playlist is created using the specific content that matched or substantially matched the content associated with the channel 504 or the previously generated playlist associated with the selected channel may be played. With reference to FIG. 4, the content 404 that best satisfied the rules 414 for the channel 504 can be associated with a particular playlist. The number of entries in the playlist can be set by the user or set by default. Alternatively, the playlists associated with the channels 502 can be automatically generated. In one embodiment, the playlists 406 represent some of the channels available to the device 400. When used in another manner, the generated content can be examined to suggest channels to the user that have an affinity with the user's content.

In another embodiment, the scanning engine returns an intersection or a correlation matrix of the content 404 and the channels available to the device 400. The correlation matrix illustrates channels having one or more matches with the content 404 on the device 400. Channels that have no hits from the content can be eliminated from the user's view or only the top channels are presented to the user.

The search or examination of the content 404 by the scanning engine 408 can be hierarchical in nature. The rules can be adapted such that the scanning engine 408 examines the content 404 in a hierarchical way. The search may first, for example, be based on artist. The results from the artist search can then be reexamined using music genre or time period or using any other attribute or characteristic. Playlists can then be generated according to the results of the search or examination of the content stored on the device or available to the device from another device.

The process of generating the playlists 406 can be a dynamic and adaptive process that accounts for changes to the content 404 on the device as well as in the content associated with the channels available to the device. User preferences, such as channel preferences, manually set presets, and other indications of the user's preferences can be incorporated into the rules 414. As a user rates content, the ratings can also be incorporated into the rules. The rules themselves can be updated as the content or channels change with time.

In addition, the user may make changes to the content that is stored on the device. By way of example and not limitation, the playlist module 412 may reexamine the content when the content changes, when the rules 414 change, and the like. As a result, the playlists 406 may be amended or replaced by the playlist module 412. The playlist module 412 may also add and/or delete playlists 406 over time.

Figure 6:
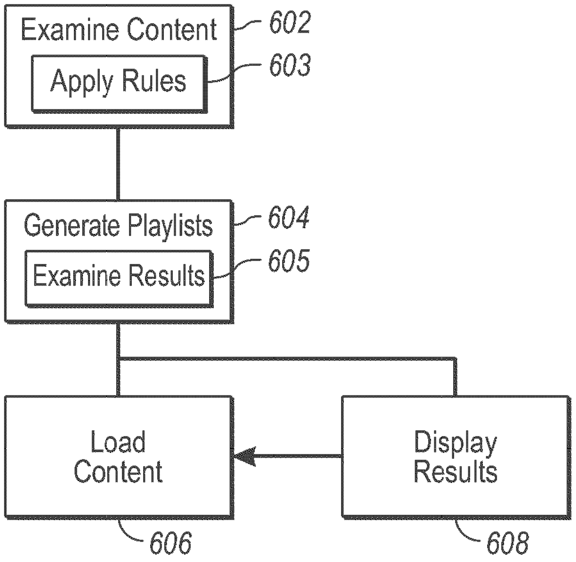
FIG. 6 illustrates an exemplary flow chart that depicts a method for discovering content on a device including generating playlists based on the rules that are related to the content of the channels available to the device.

FIG. 6 illustrates an exemplary method for discovering content. The content stored on a device is examined 602 or searched. This may include examining the content stored on other devices such as a computer with which the device docks. Examining the content 602 also includes applying rules 603 to the content. The rules can be created using a variety of sources. One source for the rules applied to the examination or search of the content is the provider of satellite radio content. These rules may be tailored to the channels delivered by satellite radio service. The rules may also be related to user preferences, content actually played by the user's device, user ratings, and the like or any combination thereof.

After the content has been examined 602, the playlists are generated 604. Generating the playlists 604 includes examining the results 605 from the application of the rules. The generated playlists may identify content that may conform with or be similar to the content that is on certain channels available to the device. The generation of the playlists may depend on how the content matches up with the channels as determined by the rules.

After the playlists are generated, results are displayed 608. As previously indicated, the results can take various forms. Typically, the results conveyed to the user on the display of the user's device include identifying the channels that have the highest affinity with the user's content. The results displayed to the user may also include a list of artists, genres, songs and an indication of how they match or are consistent with various channels. The results displayed to the user may include the generated playlists, which can then be selected and played. Alternatively, the results can indicate specific channels that have an affinity with the user's content. The user can then tune to one of the channels and discover the content on the selected channel.

After the playlists are generated 604 or after the results are displayed 608, the content may be loaded 606 according to one of the playlists or in response to a user selection of the displayed results. In one embodiment, a user may continue listening to one of the channels delivered to the device. Loading content 606 may also occur without user input, such as described below when a satellite signal is lost.

Figure 7:
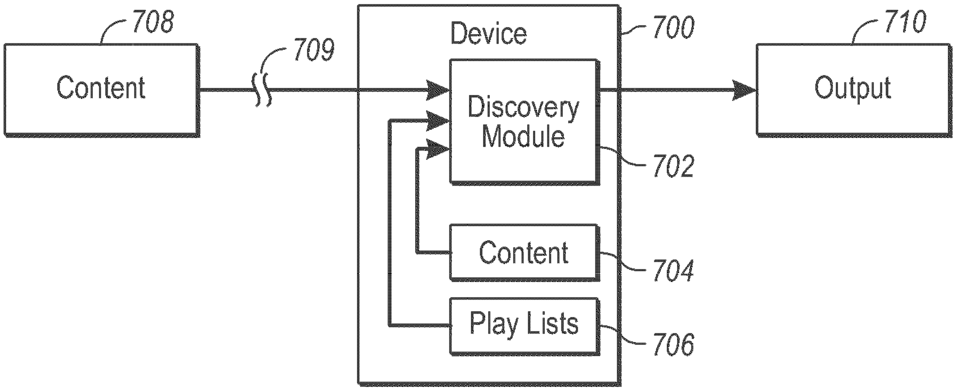
FIG. 7 illustrates one embodiment of a device that provides content when a loss of signal is detected such that the content delivered to the device is consistent to the content the user was experiencing when the loss of signal was experienced.

FIG. 7 illustrates a system where a device can ensure that the content experienced by a user is not interrupted or insure that content interruptions are minimized. In this example, the delivery of the content 708 to the device 700 is interrupted 709 or missing. This can occur in the context of satellite radio signals, for example, when the signal to noise ratio drops below some threshold, or when the satellite signal is subject to interference or obstructed by bridges, power lines, etc. If the interruption of the satellite signal is sufficient, then the device conventionally experiences an interruption where no content is played.

In this example, the discovery module 702 of the device 700 can detect a loss of signal, or insufficient signal to noise ratio, or other threshold that indicates poor reception or loss of the satellite signal. In this case, the discovery module 702 can access the playlists 706 and begin to play content 704 from the memory of the device 700 as output 710.

As previously described, the playlists 706 generated by the discovery module 702 often correspond to at least some of the channels that are included in the content 708 or that are available to the device 700. When the user is playing the content on a particular channel and that channel is lost, the discovery module 700 can select the particular playlist that corresponds to the lost channel. The playlist may include, by way of example, content from the lost channel that has been previously recorded. In this manner, the user not only experiences minimal interruption, but the user also experiences content that is consistent with the lost channel. When the channel is again received by the device, the discovery module 702 transitions back to the channel.

Figure 8:
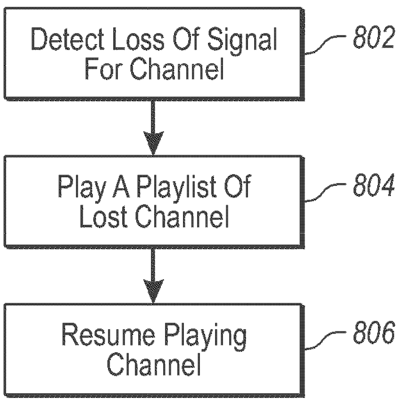
FIG. 8 is an exemplary flow diagram depicting a method for providing content to a user when loss of signal is detected.

FIG. 8 illustrates an exemplary method for providing content. In this example, a device that receives content over multiple channels from at least one network such as a satellite radio network. The device can monitor certain characteristics of the signal(s) delivering the channels. In one example, the device detects 802 loss of the signal for at least one channel. Detecting loss of the signal can include losing the channel, determining when the signal to noise ratio passes a certain threshold, and the like or other aspects or characteristics that suggest that the received signal is insufficient for the device.

When loss of signal is detected, the device plays 804 a playlist. The playlist selected and played by the device is, in one embodiment, similar in content to the channel that was playing when the loss of signal was detected. In this manner, the device experiences content that is similar. As previously indicated, the discovery module has examined the content on the device to identify the content that has affinity with the channels available to the device. Thus, each playlists may be associated with at least one channel. When a particular channel is lost, then the playlist(s) associated with that channel can be played.

In one embodiment, the device ensures that the transition from the satellite signal to the stored content is seamless. For example, the device may detect that a signal is losing strength, but may wait until the end of the song before switching to the playlist.

During this time, the device is monitoring the satellite channel such that it can determine when the signal is again satisfactory. At this point, the device resumes 806 playing the original channel. As described above, the transition from the stored content back to the satellite channel is seamless when possible. In the alternative, the device may perform a transitional content such that there is no abrupt change experienced by the user.

Embodiments within the scope of the present invention also include computer-readable media for carrying or having computer-executable instructions or data structures stored thereon for performing embodiments of the invention. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A device for generating a playlist, the device comprising:
- a processor;
- a receiver for receiving a wireless transmission of a plurality of radio channels carrying audio content, each radio channel having associated therewith metadata describing the audio content carried on the radio channel;
- computer storage media storing a plurality of audio files, each audio file having associated therewith metadata describing the content of the audio file; and
- memory storing computer executable instructions which when executed by the processor perform acts to automatically organize the plurality of audio files into playlists based on a comparison of the metadata of each audio file to the metadata of each of the plurality of radio channels, the acts comprising:
  - accessing the metadata of each of the plurality of radio channels to determine characteristics of the audio content that is carried over each of the radio channels receivable at the device;
  - accessing the metadata of each of the plurality of audio files;
  - for each audio file, comparing the metadata of the audio file to the metadata of each radio channel to determine which radio channel carries audio content that is most similar to the audio content of the audio file; and
  - for each radio channel for which it is determined that at least one audio file contains audio content that is most similar to the audio content of the radio channel, creating a playlist of each audio file that contains audio content that is most similar to the audio content of the radio channel wherein the computer executable instruction, further perform; while the receiver is tuned to a particular radio channel and the device is outputting the audio content of the particular radio channel on speakers of the device, detecting that the particular radio channel is no longer being received by the receiver; and automatically playing the playlist associated with the particular radio channel.

2. The device of claim 1, further comprising:
- a user interface where a user can select to play any of the created playlists.

3. The device of claim 1, wherein the metadata includes:
- genre of the audio content, artist of the audio content, or time period of the audio content.

4. The device of claim 1, wherein the computer storage media includes computer storage media that is external to the device, but to which the device is connected via one of a wireless or a wired connection.

5. A method, performed on a device comprising a processor, a receiver for receiving a wireless transmission of a plurality of radio channels carrying audio content, each radio channel having associated therewith metadata describing the audio content carried on the radio channel, computer storage media storing a plurality of audio files, each audio file having associated therewith metadata describing the content of the audio file, and memory, the method for automatically organizing the plurality of audio files into playlists based on a comparison of the metadata of each audio file to the metadata of each of the plurality of radio channels, the method comprising:
- accessing the metadata of each of the plurality of radio channels to determine characteristics of the audio content that is carried over each of the radio channels receivable at the device;
- accessing the metadata of each of the plurality of audio files;
- for each audio file, comparing the metadata of the audio file to the metadata of each radio channel to determine which radio channel carries audio content that is most similar to the audio content of the audio file; and
- for each radio channel for which it is determined that at least one audio file contains audio content that is most similar to the audio content of the radio channel, creating a playlist of each audio file that contains audio content that is most similar to the audio content of the radio channel further comprising: while the receiver is tuned to a particular radio channel and the device is outputting the audio content of the particular radio channel on speakers of the device, detecting that the particular radio channel is no longer being received by the receiver; and automatically playing the playlist associated with the particular radio channel.

6. The method of claim 5, further comprising:

displaying a user interface where a user can select to play any of the created playlists.

7. The method of claim 5, wherein the metadata includes:

genre of the audio content, artist of the audio content, or time period of the audio content.

8. The method of claim 5, wherein the computer storage media includes computer storage media that is external to the device, but to which the device is connected via one of a wireless or a wired connection.

9. A computer program product storing computer executable instructions which when executed on a device perform a method, the device comprising a processor, a receiver for receiving a wireless transmission of a plurality of radio channels carrying audio content, each radio channel having associated therewith metadata describing the audio content carried on the radio channel, computer storage media storing a plurality of audio files, each audio file having associated therewith metadata describing the content of the audio file, and memory, the method for automatically organizing the plurality of audio files into playlists based on a comparison of the metadata of each audio file to the metadata of each of the plurality of radio channels, the method comprising:

accessing the metadata of each of the plurality of radio channels to determine characteristics of the audio content that is carried over each of the radio channels receivable at the device;

accessing the metadata of each of the plurality of audio files;

for each audio file, comparing the metadata of the audio file to the metadata of each radio channel to determine which radio channel carries audio content that is most similar to the audio content of the audio file; and for each radio channel for which it is determined that at least one audio file contains audio content that is most similar to the audio content of the radio channel, creating a playlist of each audio file that contains audio content that is most similar to the audio content of the radio channel further comprising: while the receiver is tuned to a particular radio channel and the device is outputting the audio content of the particular radio channel on speakers of the device, detecting that the particular radio channel is no longer being received by the receiver; and automatically playing the playlist associated with the particular radio channel.

10. The computer program product of claim 9, further comprising:

displaying a user interface where a user can select to play any of the created playlists.

11. The computer program product of claim 9, wherein the metadata includes:

genre of the audio content, artist of the audio content, or time period of the audio content.

12. The computer program product of claim 9, wherein the computer storage media of the device includes computer storage media that is external to the device, but to which the device is connected via one of a wireless or a wired connection.

* * * * *